United States Patent
Lynch

(10) Patent No.: US 9,521,373 B2
(45) Date of Patent: Dec. 13, 2016

(54) AQUA VIDEO SYSTEM AND METHOD

(71) Applicant: Daniel V. Lynch, Indian Head Park, IL (US)

(72) Inventor: Daniel V. Lynch, Indian Head Park, IL (US)

( * ) Notice: Subject to any disclaimer, the term of this patent is extended or adjusted under 35 U.S.C. 154(b) by 413 days.

(21) Appl. No.: 13/959,735

(22) Filed: Aug. 5, 2013

(65) Prior Publication Data

US 2014/0036059 A1 Feb. 6, 2014

Related U.S. Application Data

(60) Provisional application No. 61/742,201, filed on Aug. 6, 2012.

(51) Int. Cl.
*H04N 7/18* (2006.01)

(52) U.S. Cl.
CPC ....................................... *H04N 7/18* (2013.01)

(58) Field of Classification Search
None
See application file for complete search history.

(56) References Cited

U.S. PATENT DOCUMENTS

| | | | |
|---|---|---|---|
| 3,674,925 A | 7/1972 | Heckman, Jr. | |
| 4,212,258 A | 7/1980 | Collins | |
| 4,281,343 A | 7/1981 | Monteiro | |
| 5,316,412 A | 5/1994 | Sondergard | |
| 5,663,897 A | 9/1997 | Geiser | |
| 5,778,259 A | 7/1998 | Rink | |
| 6,097,424 A | 8/2000 | Zernov et al. | |
| 6,292,436 B1 | 9/2001 | Rau et al. | |
| 6,386,885 B1 | 5/2002 | Ford | |
| 6,525,762 B1 | 2/2003 | Mileski et al. | |
| 7,072,244 B2 | 7/2006 | Rogers | |
| 7,594,609 B2 | 9/2009 | Kotlarsky et al. | |
| 7,631,445 B2 | 12/2009 | Harnell | |
| 7,826,729 B2 | 11/2010 | Cullen et al. | |
| 7,845,303 B2 | 12/2010 | Hawkes | |
| 8,025,021 B2 | 9/2011 | Gosling | |
| 8,087,311 B2 | 1/2012 | Merlo | |
| 8,098,545 B2 | 1/2012 | Rhodes et al. | |
| 8,120,650 B2 | 2/2012 | Laser | |
| 8,120,651 B2 | 2/2012 | Ennis | |
| 8,472,285 B2 | 6/2013 | Day | |
| 2007/0064208 A1* | 3/2007 | Giegerich | F16M 11/18 353/122 |
| 2007/0276552 A1 | 11/2007 | Rodocker et al. | |

(Continued)

OTHER PUBLICATIONS

Swimm.ee & http://swim.ee/technique/tech_testing_analysis.html, Web Prints, Rein Haljand, Ph.D., Aug. 31, 2013.

*Primary Examiner* — Sath V Perungavoor
*Assistant Examiner* — Janese Dudley
(74) *Attorney, Agent, or Firm* — Lawrence E. Thompson

(57) ABSTRACT

Disclosed are various embodiments for capturing underwater video images. In a representative embodiment an underwater video system may include a sled, a camera affixed to the sled, a plurality of anchors, one or more sled tethers, the sled tethers affixed to the anchors and configured to confine the sled to a path between the anchors, a viewing station, the viewing station being configured to receive and capture images from the camera, and a motor, the motor configured to move the sled on the path between the anchors.

13 Claims, 3 Drawing Sheets

(56) References Cited

U.S. PATENT DOCUMENTS

2008/0317451 A1    12/2008  Enjo
2010/0212573 A1     8/2010  Hawkes et al.
2010/0304934 A1*  12/2010  Woodson ........... A63B 24/0062
                                                                 482/8
2012/0214363 A1*   8/2012  Riggs ..................... B63H 21/17
                                                                 440/6

\* cited by examiner

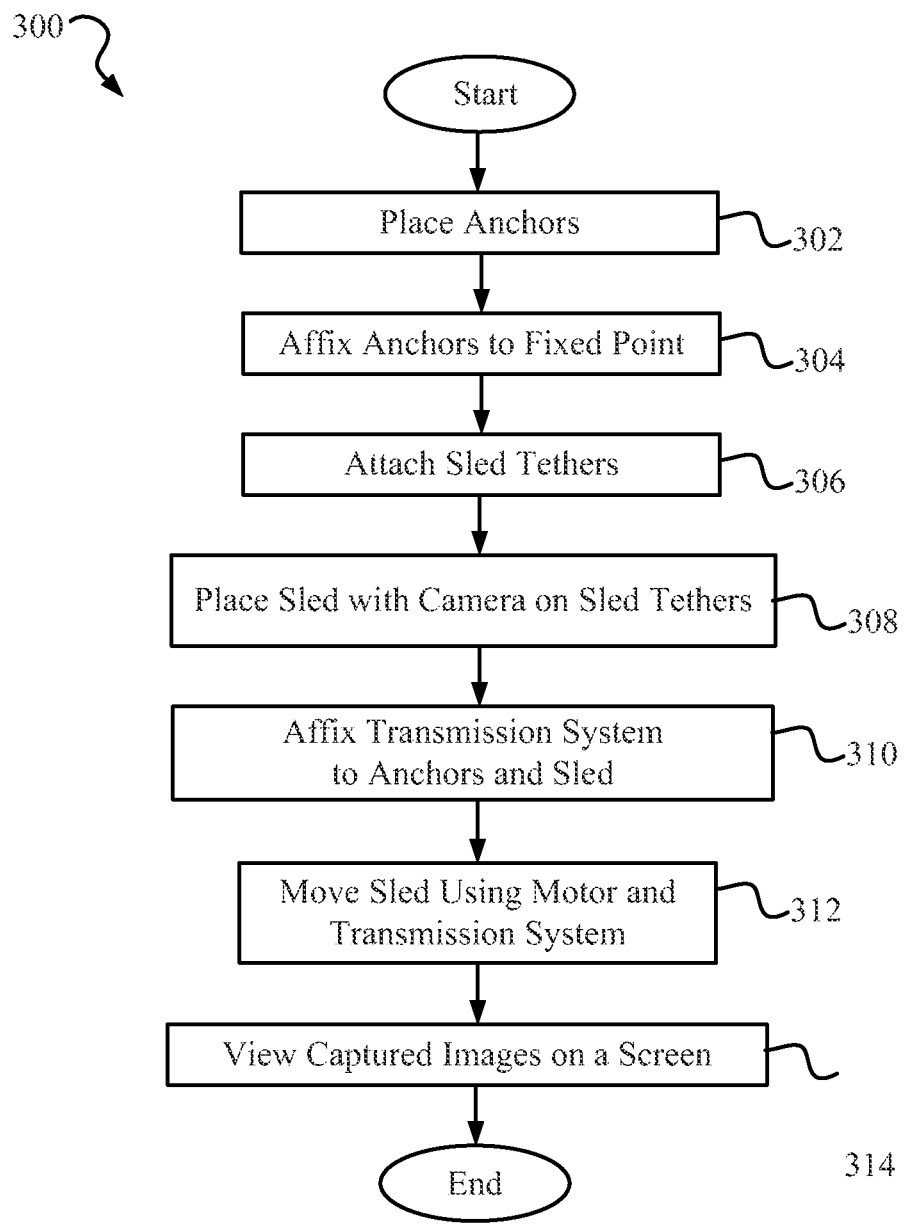

AQUA VIDEO SYSTEM AND METHOD

CROSS-REFERENCE TO RELATED APPLICATION

This application claims the benefit of U.S. Provisional Application No. 61/742,201, filed Aug. 6, 2012.

BACKGROUND

Field

This invention is generally related to underwater video technology, and in particular, to a system and method for conducting underwater video photography.

Background

Various methods and systems related to underwater video technology are known in to those having ordinary skill in the art. However, the known systems and methods are not optimal for capturing and tracking underwater video images.

SUMMARY

Disclosed herein is a new and improved system and method for capturing underwater video. In accordance with one aspect of the approach, the system may include an underwater video system, the system comprising a sled, a camera affixed to the sled, a plurality of anchors, one or more sled tethers, the sled tethers affixed to the anchors and configured to confine the sled to a path between the anchors, a viewing station, the viewing station being configured to receive and capture images from the camera, and a motor, the motor configured to move the sled on the path between the anchors.

In another aspect of the approach, a method of placing anchors underwater, the method may include affixing the anchors to a fixed point, attaching sled tethers to the anchors, placing a sled with a camera on the sled tethers, affixing a transmission system to the anchors and sled, moving the sled using the transmission system, and viewing captured images on a screen.

Other systems, methods, aspects, features, embodiments and advantages of the underwater video system and method disclosed herein will be, or will become, apparent to one having ordinary skill in the art upon examination of the following drawings and detailed description. It is intended that all such additional systems, methods, aspects, features, embodiments and advantages be included within this description, and be within the scope of the accompanying claims.

BRIEF DESCRIPTION OF THE DRAWINGS

Many aspects of the present disclosure can be better understood with reference to the following drawings. It is to be understood that the drawings are solely for purpose of illustration. Furthermore, the components in the figures are not necessarily to scale, emphasis instead being placed upon clearly illustrating the principles of the system and method disclosed herein. In the figures, like reference numerals designate corresponding parts throughout the different views.

FIG. 3 is a block diagram showing a method of conducting underwater video photography.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

Figure 1:
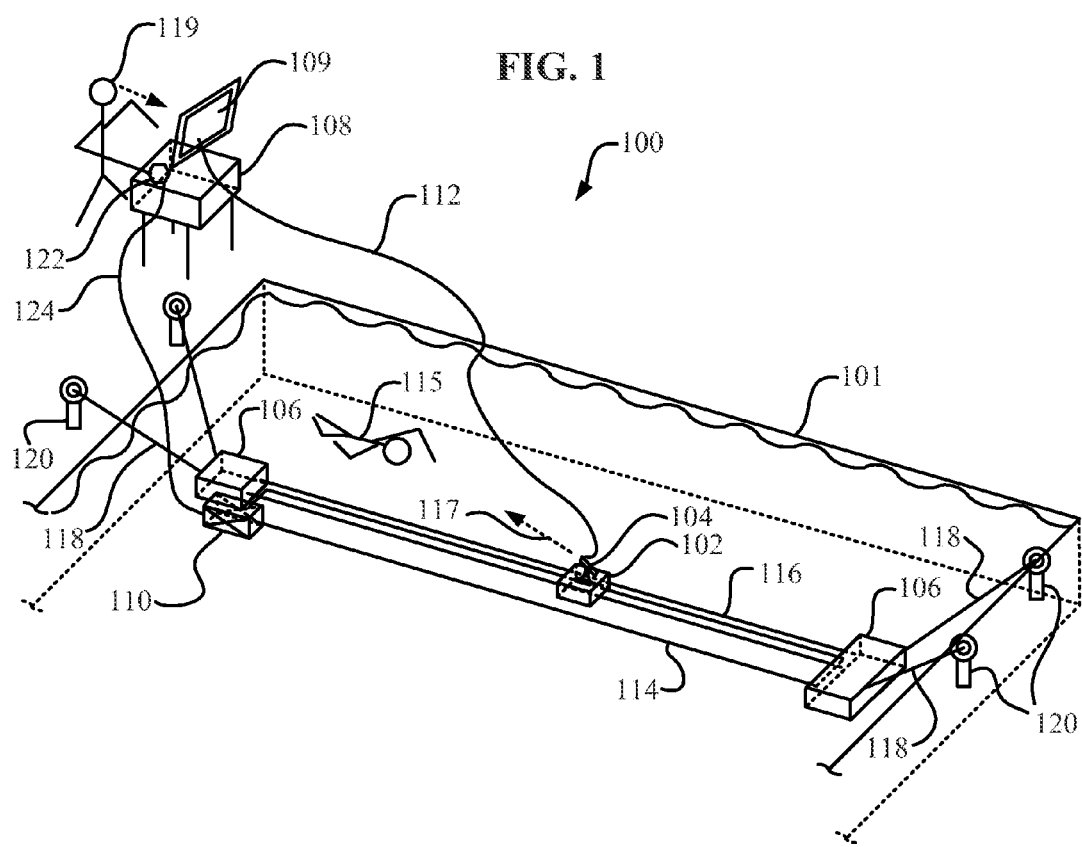
FIG. 1 is a perspective view of an underwater video system employed in an aquatic environment, including a sled and a camera.

With reference to FIG. 1, shown is an exemplary underwater video system 100 employed in an aquatic environment 101. In the example of FIG. 1, the aquatic environment 101 is a pool. The underwater video system 100 may include a sled 102, a camera 104, a plurality of anchors 106, a viewing and control station 108, a motor 110, a video communication connection 112, and a transmission system 114. In general, the underwater video system 100 allows for the camera 104 to travel on the sled 102 between the anchors 106, allowing captured images to be provided over the video communication connection 112 to the viewing station 108, to be viewed on a screen 109.

Although it is contemplated that the underwater video system 100 may be employed in number of different environments and applications, one application illustrated in FIG. 1 is using the underwater video system 100 as a training aid in a swimming pool so that captured images of swimmer 115 may be transmitted and viewed at the viewing station 108. For example, the camera 102 may be pointed in the direction of arrow 117 in order to capture images of an object, such as the swimmer 115, so that the images can be transmitted to the trainer 119 at the viewing and control station 108. The underwater video system 100 allows for the trainer 119 to capture numerous views, such as but not limited to, head-on, angular, side, tail, propulsive individual stroke, body undulation, breathing, etc. Thus, the trainer 119 can provide immediate feedback and later analysis. Using the underwater video system 100, the trainer 119 may review and compare angularity of strokes, number of strokes, stroke cycle, stroke rate, leg kick velocity, swim stroke efficiency, undulation and breathing to earlier swimmer videos, or other swimmers training videos.

Addition applications for the underwater video system 100 include habitat mapping. In such habitat applications, the camera 104 may capture 104 images from a number of angles, such as horizontal and vertical, and the camera 104 may be mounted on portions of the sled 102 other than the top, such as shown in FIG. 1

One or more sled tethers 116 may be used to confine the sled 102 to a path between the anchors 106. One or more boundary tethers 118 may be use to place and maintain the anchors 106 by securing the anchors 106 to one or more fixed points 120. The boundary tethers 118 may be affixed to the anchors 106 in a number of manners, including, but not limited to, the use of pulleys, loops, eyelets, and other fastening means. The transmission system 114 may be used to transmit a motive force generated by the motor 110 to the sled 102, in order to control the movement of the sled 102 on the path between the anchors 106. The speed and direction of the motor 110 may be controlled using a motor controller 122 that may be located at the viewing station 108. The motor controller 122 may be connected to the motor 110 by a motor control connection 124. The screen 109 and motor controller 122 may also be incorporated into one device, for example a laptop computer.

Figure 2:
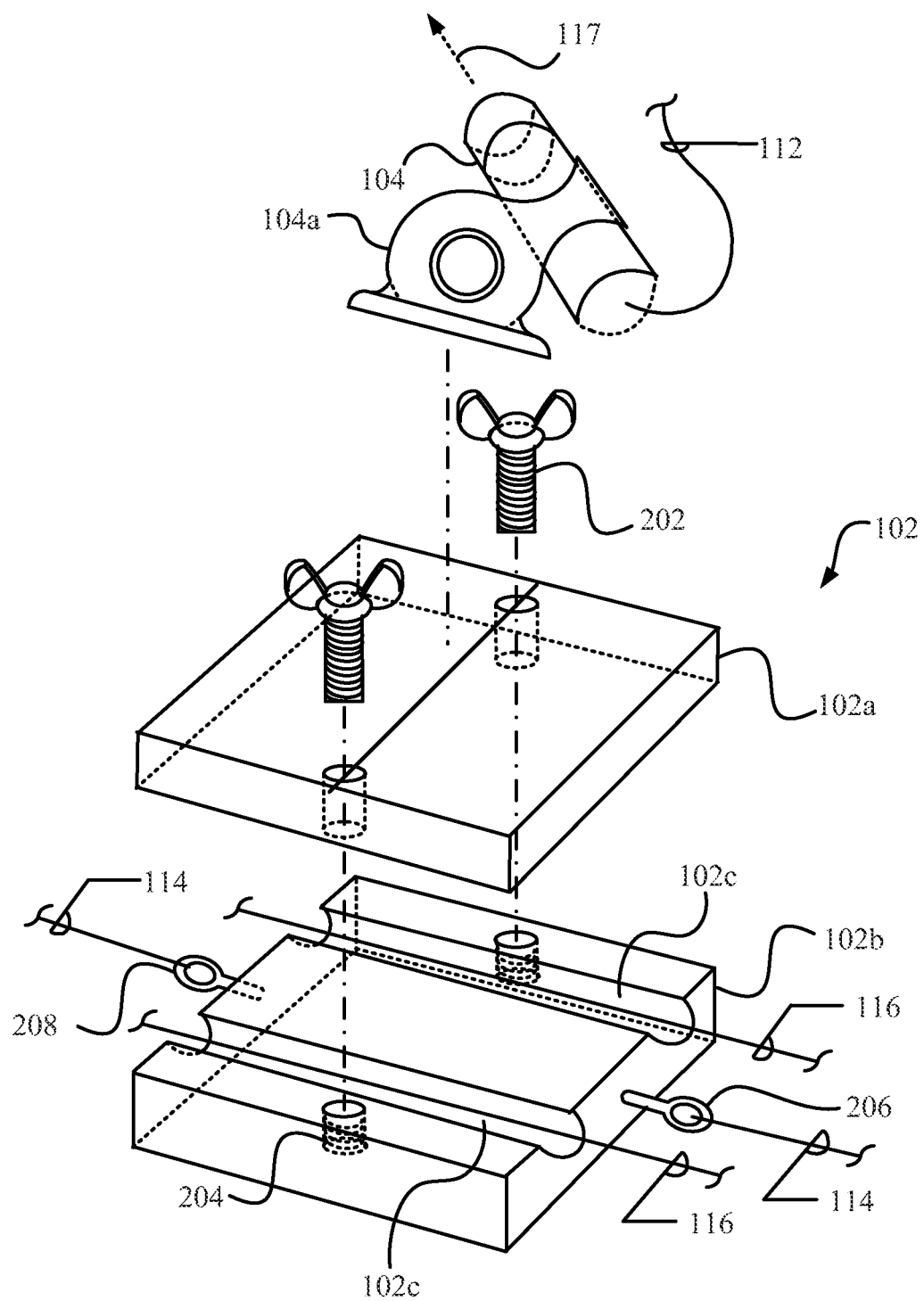
FIG. 2 is a more detailed exploded view of the sled and camera of FIG. 1.

FIG. 2 shows a more detailed exploded view of the exemplary sled 102 and camera 104, along with the portions of the transmission system 114, the sled tethers 116, and the video communication connection 112. As shown in FIG. 2, the sled 102 may included an upper portion 102a, a lower portion 102b, and one or more troughs 102c. The upper 102a and lower 102b portions may be fastened together, for example using fasteners one or more fasteners 202 that me be rotated into threaded bores 204, in order to enclose the sled 102 around the sled tethers 116. The sled 102 may also include a first eyebolt 206 and a second eyebolt 208 to which the transmission system 114 may be attached.

The camera 104 may include a positioning base 104a which may allow for the camera to be positioned in a desired position for capturing images. For example, the positioning base 104a may be adjusted to allow for optimum capturing of images of swimmer 115. The camera 104 may be secured to the sled 102 using one or more fasteners (not shown), such as, but not limited to glue, screws, bolts, etc.

Although shown as a swimming pool, the aquatic environment 101 may include a number of man-made and natural environments, such as, but not limited to lakes, rivers, oceans, and reservoirs. The sled 102 may be fashioned in a number of manners that will be apparent to those skilled in the art to accomplish the functions described herein. The sled 102 may be constructed of a number of materials including, but not limited to, plastic and wood. The sled 102 may be configured for different aquatic environments and operation by including a weight adjustment system (not shown) as may be appreciated by those skilled in the art. The camera 104 may be a number of commercially available water proof cameras capable of transmitting a signal that included images captured by the camera.

The anchors 106 may be constructed of a number of materials and may include heavy materials such as, but not limited to sand. Although the anchors may rest on the bottom of the aquatic environment 101, for example the pool, in some applications, the anchors may be allowed to float, for example by limiting the length of the boundary tethers 118, which may allow for the sled 102 to travel in a horizontal path, of a horizontal path is desired, regardless of the contour of the bottom of the aquatic environment 101. The anchors 106, in combination with the sled tethers 116, may be configured to maintain tension on the sled tethers 116 between the anchors 106 to allow for the sled 102 to travel in a generally straight path between the anchors 106.

The viewing control station 108 may be a number of fixed or mobile platforms suitable for viewing captured images. The motor 110 may be a number of commercially available motors. Although shown submerged and attached to one of the plurality of anchors 106, the motor could be located in other locations, for example, the motor 110 may be kept dry by locating it above or to the side of the aquatic environment 101 wherein the transmission system 114 may include a portion for transferring the motive force from the dry motor to the underwater portion of the transmission system (such as the portion shown in FIG. 1). In some applications, the motor 110 may be eliminated, and the transmission system may include ropes extending out of the aquatic environment 101, where the ropes may be pulled by people, or mechanical means located out of the aquatic environment 101.

The video communication connection 112 and the motor control connection 124 are shown with hard connections in FIG. 1. The video connection 112 may be standard CCTV cable. However, in many applications, connections 112 and 124 may be wireless. In such applications, receivers (not shown) and transmitters (not shown) may be used to transmit motor control signals and the video images. For example, underwater transmitters may be used to send signals to receivers located at the viewing control station 108.

Motor controller 122 is shown located at the viewing control station in FIG. 1. However, it is anticipated that in many applications, it may be convenient to allow the motor controller to be transported around the aquatic environment 101. Although fasteners, such as fasteners 202 and eyebolts 206 and 208 are shown, other fasteners are known to those skilled in the art.

The sled tethers 116 and boundary tethers 118 may be constructed of a number of materials including wire, cloth, hemp, and plastic rope. The fixed points 120 may be a number of devices and systems, including, but not limited to swimming pool lane anchors and weights and/or screws affixed to the an area on the side of the aquatic environment 101. The transmission system 114 may include a plurality of pullets and eyelets affixed to the anchors 106 and the sled 102. The transmission system 114 may include wires for transmitting the motive force from the motor 110 to the sled 102.

FIG. 3 shows a block diagram of an exemplary method of conducting underwater video photography 300. The method 300 may include a first step 302 of placing anchors, a second step 304 of affixing the anchors to one or more fixed point, a third step 306 of attaching tethers to the anchors and a sled, a fourth step 308 of placing a sled with a camera on the sled tethers, a fifth step 310 of affixing a transmission system to the anchors and sled, a sixth step 312 of moving the sled using the transmission system, and a seventh step 314 of viewing captured images on a screen.

In one embodiment, the method 300 may include placing anchors, such as anchors 106 in underwater environment 101, affixing the anchors 106 to a fixed point, such as fixed point 120, a third step 306 of attaching tethers, such as sled tethers 116, to the anchors 106, a fourth step 308 of placing a sled, such as sled 102, with a camera, such as camera 104, on the sled tethers 116, a fifth step 310 of affixing a transmission system, such as transmission system 114, to the anchors 106 and sled 102, a sixth step 312 of moving the sled 102 using the transmission system 114, and a seventh step 314 of viewing captured images on a screen, such as screen 109.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the appended claims.

The above description of the disclosed embodiments is provided to enable any person skilled in the art to make or use that which is defined by the appended claims. The following claims are not intended to be limited to the disclosed embodiments. Other embodiments and modifications will readily occur to those of ordinary skill in the art in view of these teachings. Therefore, the following claims are intended to cover all such embodiments and modifications when viewed in conjunction with the above specification and accompanying drawings. All such modifications and variations are intended to be included herein within the scope of this disclosure and protected by the following claims.

What is claimed is:

1. An underwater video system, the system comprising:
    a sled having one or more hollow passages;
    a camera affixed to the sled;
    a plurality of anchors;
    one or more sled tethers, the sled tethers affixed to the anchors and configured to confine the sled to a path between the anchors, the hollow passages configured to slideably enclose one of the sled tethers;
    a viewing station, the viewing station being configured to receive and capture images from the camera; and
    a motor, the motor configured to move the sled on the path between the anchors.

2. The underwater video system of claim 1, further including a video communication connection, the video communication connection configured to carry a video signal from the camera to the viewing station.

3. The underwater video system of claim 2, where the video communication connection is wireless.

4. The underwater video system of claim 1, further including a motor controller and a motor control connection, the motor control connection configured to carry a motor control signal from the motor controller to the motor.

5. The underwater video system of claim 4, where the motor control connection is wireless.

6. The underwater video system of claim 1, further including one or more boundary tethers, where at least one of the anchors is submerged and the one or more boundary tethers secure the at least one anchor to one or more fixed points.

7. The underwater video system of claim 1, where the anchors are submerged and tethered to at least two fixed points, and the anchor is above a floor of an aquatic environment.

8. The underwater video system of claim 1, where the viewing station includes a laptop computer.

9. The underwater video system of claim 1, where the motor is submersible.

10. The underwater video system of claim 1, where the motor is submerged.

11. The underwater video system of claim 1, further including a submersed transmission system, wherein the submersed transmission system conducts a motive force generated by the motor to the sled.

12. The underwater video system of claim 1, wherein the speed and direction of the sled are controlled with a motor controller at the viewing station.

13. A method of conducting underwater video photography, the method including the steps of:
    placing anchors underwater;
    affixing the anchors to a fixed point;
    attaching one or more sled tethers to the anchors;
    placing a sled with a camera on the sled tethers, including placing the sled tethers in one or more hollow passages of the sled;
    affixing a transmission system to the anchors and sled;
    moving the sled using the transmission system; and
    viewing captured images on a screen.

* * * * *